(12) United States Patent
Wang et al.

(10) Patent No.: US 9,638,951 B2
(45) Date of Patent: May 2, 2017

(54) COLOR FILTER SUBSTRATE, ARRAY SUBSTRATE, LIQUID CRYSTAL PANEL AND LIQUID CRYSTAL DISPLAY DEVICE

(71) Applicant: BOE TECHNOLOGY GROUP CO., LTD., Beijing (CN)

(72) Inventors: Qiangtao Wang, Beijing (CN); Wenbing Li, Beijing (CN); Xinli Ma, Beijing (CN); Yan Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 188 days.

(21) Appl. No.: 14/127,393

(22) PCT Filed: Dec. 3, 2012

(86) PCT No.: PCT/CN2012/085768
§ 371 (c)(1),
(2) Date: Dec. 18, 2013

(87) PCT Pub. No.: WO2014/008738
PCT Pub. Date: Jan. 16, 2014

(65) Prior Publication Data
US 2015/0212367 A1  Jul. 30, 2015

(30) Foreign Application Priority Data

Jul. 13, 2012 (CN) .......................... 2012 1 0245099

(51) Int. Cl.
*G02F 1/1335* (2006.01)
*G02B 5/20* (2006.01)
*G02F 1/1362* (2006.01)

(52) U.S. Cl.
CPC ....... *G02F 1/133514* (2013.01); *G02B 5/201* (2013.01); *G02F 1/136286* (2013.01); *G02F 2201/52* (2013.01)

(58) Field of Classification Search
CPC ......... G02F 1/133617; G02F 1/133512; G02F 1/133609; G02F 1/133516; G02F 1/133603; G02F 1/133514; G02F 2202/36
(Continued)

(56) References Cited

U.S. PATENT DOCUMENTS 4,458,175 A * 7/1984 Weekley ........................ 313/472
4,986,637 A * 1/1991 Yamaguchi .................. 349/109
(Continued)

FOREIGN PATENT DOCUMENTS

CN     102759819 A    10/2012

OTHER PUBLICATIONS

International Preliminary Report on Patentability dated Jan. 13, 2015; PCT/CN2012/085768.
(Continued)

*Primary Examiner* — Hoan C Nguyen
(74) *Attorney, Agent, or Firm* — Ladas & Parry LLP

(57) ABSTRACT

A color filter substrate, an array substrate, a liquid crystal panel and a liquid crystal display device are disclosed. Said color filter substrate includes a plurality of pixel units, wherein said pixel unit comprises two diamond shaped sub-pixels and four isosceles triangle shaped sub-pixels, every two isosceles triangle shaped sub-pixels are arranged into a sub-pixel column with their vertex angles opposite to each other, and two sub-pixel columns are parallel to each other; said two diamond shaped sub-pixels and said two sub-pixel columns are disposed alternatively in horizontal direction; and colors of said diamond sub-pixels and the isosceles triangle shaped sub-pixels at least contains red, blue and green. The liquid crystal panel can enhance color reproducibility of the liquid crystal display panel and refinement degree of picture display and hence improving reality of picture display effect.

14 Claims, 4 Drawing Sheets

(58) Field of Classification Search
USPC .................................. 349/106, 110; 345/106
See application file for complete search history.

(56) References Cited

U.S. PATENT DOCUMENTS

| | | | |
|---|---|---|---|
| 6,281,861 B1* | 8/2001 | Harrold ............................ | 345/32 |
| 2004/0080696 A1* | 4/2004 | Kanazawa et al. ........... | 349/130 |
| 2010/0013853 A1* | 1/2010 | Takatori ........................ | 345/611 |

OTHER PUBLICATIONS

International Search Report mailed Apr. 18, 2013; PCT/CN2012/085768.
First Chinese Office Action dated Jun. 3, 2014: Appln. No. 201210245099.2.

* cited by examiner

COLOR FILTER SUBSTRATE, ARRAY SUBSTRATE, LIQUID CRYSTAL PANEL AND LIQUID CRYSTAL DISPLAY DEVICE

TECHNICAL FIELD

Embodiments of the present invention relate to the field of manufacturing liquid crystal display panels, particularly to a color filter substrate, an array substrate and a liquid crystal panel and a liquid crystal display device using them.

BACKGROUND

A liquid crystal display panel mainly consists of a color filter substrate, an array substrate and a liquid crystal layer sandwiched therebetween. The color filter substrate comprises M rows by N columns of pixel units each containing a red (R) sub-pixel unit, a green (G) sub-pixel unit and a blue (B) sub-pixel unit. The color filter substrate can exhibit different colors by transmitting different optical bands at the three sub-pixels of different colors and exhibits desired colors by controlling transmitted light intensity of the three sub-pixels of different colors. Accordingly, M rows by N columns of pixel units are disposed on the array substrate; each of the pixel units contains three sub-pixel units and is driven by three data lines and one gate line. It is possible to control light brightness by controlling the gate lines and data lines, thereby allowing each sub-pixel unit to display different color, and realizing display of the entire picture. However, a conventional liquid crystal display contains only three sub-pixel units of three colors. Their color reproducibility, transmittance of display panel and resolution of the display for picture details are poor, which limit the reality of picture display effect.

SUMMARY

Embodiments of the present invention provide a color filter substrate, an array substrate, a liquid crystal panel and a liquid crystal display device for enhancing display effect of the liquid crystal display panel.

In order to achieve the above-mentioned object, embodiments of the present invention adopt the following technical solutions:

In one aspect, a color filter substrate including a plurality of pixel units is provided, wherein said pixel unit comprises two diamond shaped sub-pixels and four isosceles triangle shaped sub-pixels, every two isosceles triangle shaped sub-pixels are arranged into a sub-pixel column with vertex angles opposite to each other, and two sub-pixel columns are parallel to each other; said two diamond shaped sub-pixels and said two sub-pixel columns are disposed alternatively in horizontal direction; and colors of said diamond sub-pixels and the isosceles triangle shaped sub-pixels at least contains red, blue and green.

In another aspect, a array substrate including a plurality of pixel units is provided, wherein said pixel unit comprises two diamond shaped sub-pixel units and four isosceles triangle shaped sub-pixel units which correspond to locations of the six sub-pixels in the color filter substrate according to claim 1 respectively.

In yet another aspect, a liquid crystal panel including the above-mentioned color filter substrate and the above-mentioned array substrate disposed oppositely thereto is provided.

In yet another aspect, a liquid crystal display device including the above-mentioned liquid crystal panel is provided.

The color filter substrate, the array substrate, the liquid crystal panel and the liquid crystal display device provided in embodiments of the present invention have the following advantages with respect to conventional technology:

1. The adoption of isosceles triangle and diamond shaped sub-pixels can elaborately display contours of irregular images, thereby enhancing the resolution of the display for picture details.

2. The addition of sub-pixels with colors other than red, green and blue not only broadens the color gamut of the color filter substrate and enhances the color reproducing effect of the liquid crystal display panel, but also increases transmittance of the color filter substrate and reduces the overall power consumption of the liquid crystal display panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The term "connection" as used in the patent application specification of the present invention and claims is not limited to a physical or mechanical connection, but may comprise electrical connections either direct or indirect. Terms such as "over", "under", "left" and "right" are only for describing relative position relationships that would vary accordingly when absolute positions of the described objects vary.

Embodiment I

Figure 1:
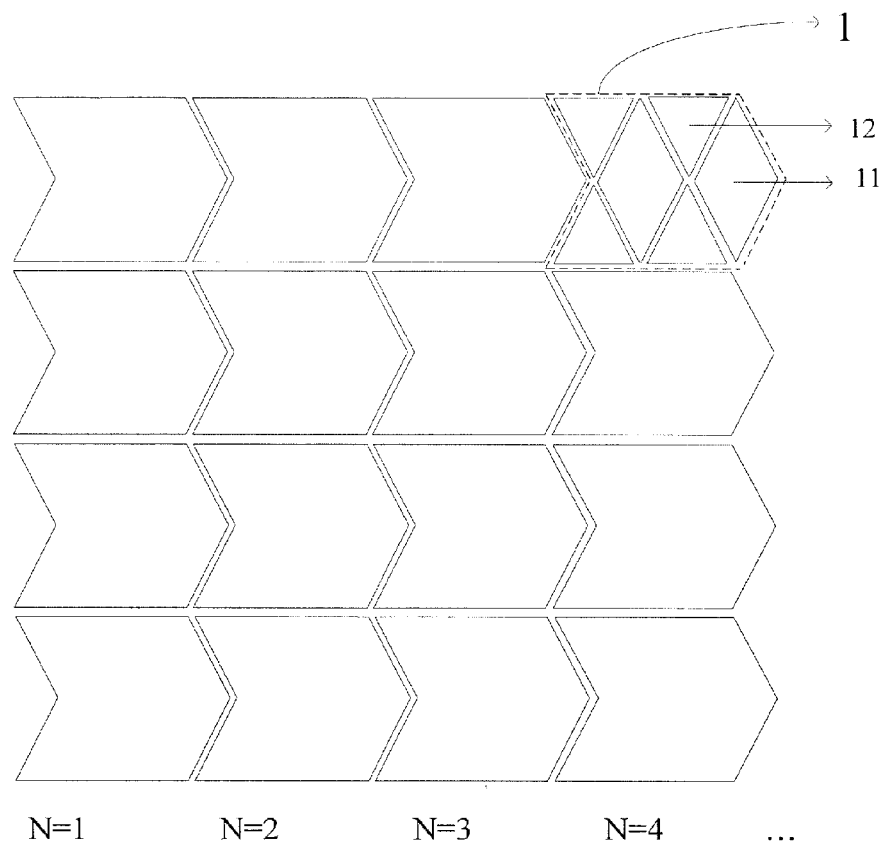
FIG. 1 schematically illustrates a structural representation of a color filter substrate according to a first embodiment of the present invention.
Figure 2:
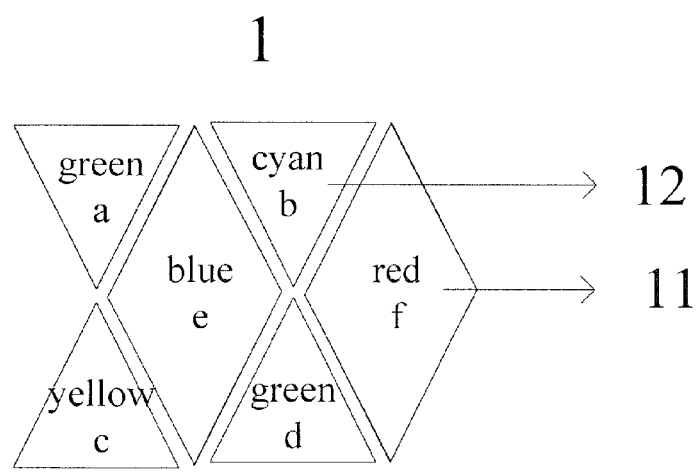
FIG. 2 schematically illustrates a color distribution diagram of a color filter sub-pixels according to an example of the present invention.

As shown in FIG. 1, the color filter substrate provided according to the embodiment of the present invention comprises a plurality of pixel units 1 arranged in an array of M rows×N columns, wherein M and N are positive integers. Each pixel unit 1 comprises six color filter sub-pixels, that is, two diamond shaped color filter sub-pixels 11 and four isosceles triangle shaped color filter sub-pixels 12. Preferably, the two diamond shaped sub-pixels are congruent, and said four isosceles triangle shaped sub-pixels are congruent. Among them, the four isosceles triangle shaped color filter sub-pixels 12 are arranged into two sub-pixel columns parallel to each other horizontally. In each sub-pixel column, the two isosceles triangle shaped color filter sub-pixels 12 are arranged with their vertex angles opposite to each other, to make the height of pixel unit 1 (or the height of the sub-pixel column) equal to a sum of the heights of the two isosceles triangles. The diamond shaped color filter sub-pixels 11 and the two sub-pixel columns are arranged alternately in a horizontal direction. For example, as shown in FIG. 2, from right to left, the sub-pixels are in turn: a diamond shaped sub-pixel 11, a triangle shaped sub-pixel column, a diamond shaped sub-pixel 11 and a triangle shaped sub-pixel column; and vice versa. The diamond shaped color filter sub-pixel 11 has one of its diagonals disposed in a longitudinal direction (vertical direction), which makes the height of the pixel unit 1 equal to the length of this diagonal of the diamond shaped color filter sub-pixel 11. Such an arrangement can have the tops or bottoms of pixel units in a same row to be flushed with each other, namely kept in one plane, thereby ensuring that the gate lines can be routed along a straight line, and reducing routing difficulty.

In the embodiment of the present invention, the six color filter sub-pixels in each pixel unit 1 have colors containing at least red, blue and green. For example, in one example, the colors for the two diamond shaped sub-pixels are any two of red, blue and green, while the color for one of the four isosceles triangle shaped sub-pixels is the remaining one. Alternatively, the color for one of the two diamond shaped sub-pixels is red, blue or green, while the colors for two of the four isosceles triangle shaped sub-pixels are the remaining two colors. Alternatively, three of the four isosceles triangle shaped sub-pixels have red, blue and green colors respectively, while the two diamond shaped sub-pixels do not have any of the above-mentioned colors. However, it is understood that the six colors for the six sub-pixels may be different, or may be partially identical. For example, in the six sub-pixels, two sub-pixels have the same color, while this is independent on the shapes of sub-pixels.

FIG. 2 schematically illustrates a color distribution diagram of the color filter sub-pixels according to one example of the present invention. As shown in FIG. 2, the colors for the two diamond shaped color filter sub-pixels 11 in the pixel unit 1 are set as red and blue respectively. Two of the four triangle shaped sub-pixels 12 that are not in the same sub-pixel column and nonadjacent are set to green color, the other two triangle shaped sub-pixels 12 are set to any two colors of yellow, cyan, pink or white, for example yellow or cyan shown in FIG. 2. Specifically, the left diamond shaped sub-pixel 11e is set to blue, the right diamond shaped sub-pixel 11f is set to red, the sub-pixel 12a on top of the left sub-pixel column and the sub-pixel 12d at the bottom of the right sub-pixel column is set to green, the sub-pixel 12c at the bottom of the left sub-pixel column is set to yellow, and the sub-pixel 12b on top of the right sub-pixel column is set to cyan.

Figure 3:
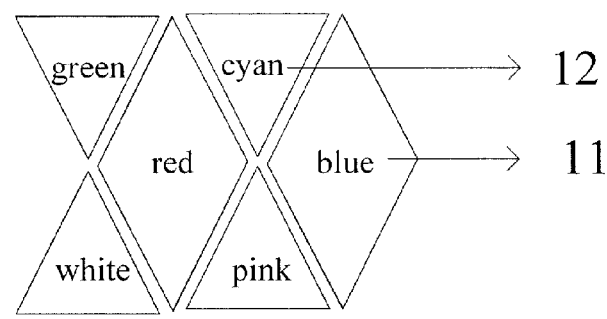
FIG. 3 schematically illustrates a color distribution diagram of a color filter sub-pixels according to another example of the present invention.

FIG. 3 schematically illustrates a color distribution diagram of color filter sub-pixels according to another example of the present invention. As shown in FIG. 3, in this pixel unit 1, the colors for the two diamond shaped color filter sub-pixels 11 are set as red and blue, the color for one of the four triangle shaped sub-pixel 12 is set to green, the other three triangle shaped sub-pixels 12 are set to three of yellow, cyan, pink and white, such as white, cyan and pink as shown in FIG. 3. Specifically, the left diamond shaped sub-pixel 11 is set to red, the right diamond shaped sub-pixel 11 is set to blue, the sub-pixel 12 on top of the left sub-pixel column is set to green, the sub-pixel 12 at the bottom of the left sub-pixel column is set to white, the sub-pixel 12 on top of the right sub-pixel column is set to cyan, and the sub-pixel 12 at the bottom of the right sub-pixel column is set to pink.

In the color filter substrate according to the embodiment of the present invention, adoption of isosceles triangle and diamond shaped sub-pixels can display contours of irregular images more elaborately. Addition of yellow, cyan, pink and white sub-pixels broadens color gamut of the color filter substrate. In addition, the yellow sub-pixels have higher transmittance with respect to red, green and blue sub-pixels, thereby improving transmittance of the color filter substrate and reducing the overall power consumption of the liquid crystal display panel. In summary, the pixel units of the color filter substrate according to the embodiment of the present invention improve color display effect of the liquid crystal display panel as a whole and reduce the power consumption of the liquid crystal display panel.

Embodiment II

Figure 4:
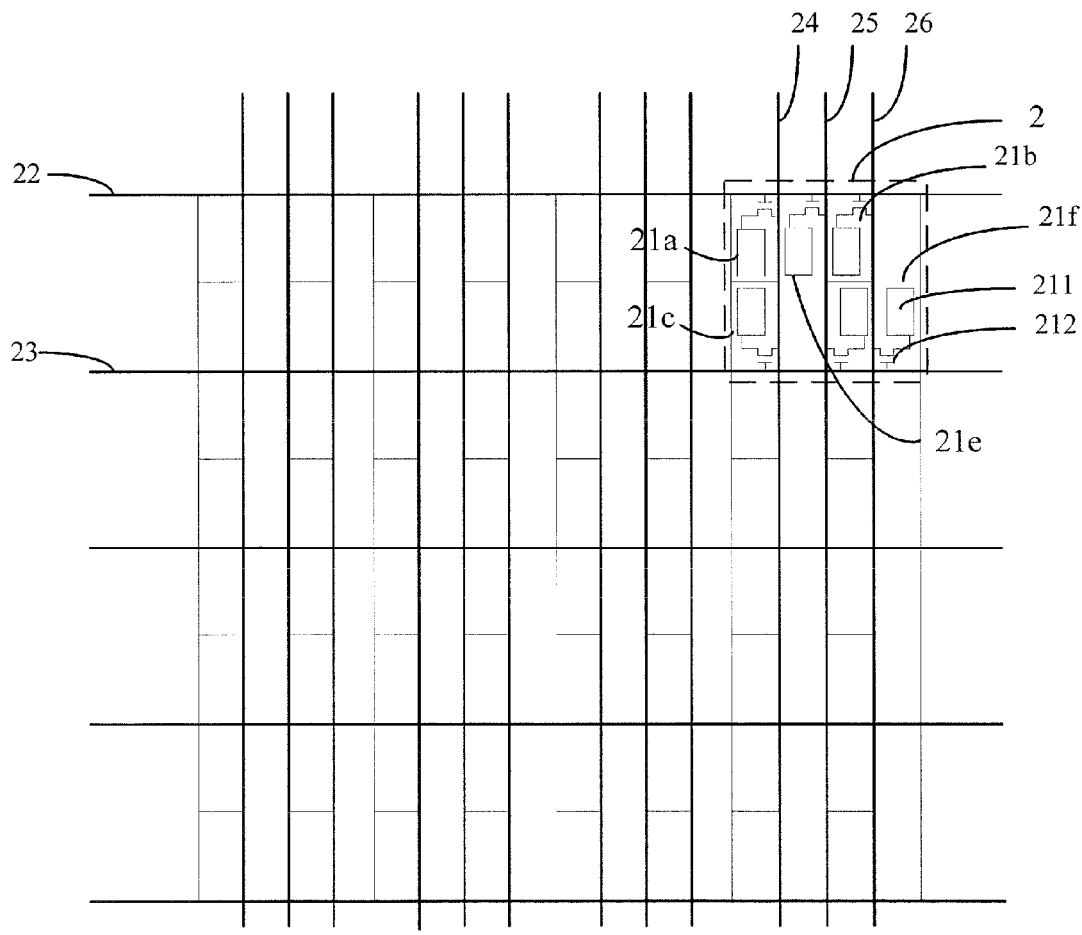
FIG. 4 schematically illustrates a structural representation of an array substrate according to a second embodiment of the present invention.

The array substrate according to the embodiment of the present invention comprises a plurality of pixel units 2 arranged in an array of M rows×N columns, wherein each pixel unit 2 is disposed oppositely to each pixel unit on the color filter substrate, such as the pixel unit 1 in embodiment I. As shown in FIG. 4, the pixel unit 2 comprises six sub-pixel units 21 each including a pixel electrode 211 and a thin film transistor 212 with a drain connected with the pixel electrode 211. Specifically, the six sub-pixel units 21 are disposed oppositely to the six color filter sub-pixels of the color filter substrate in embodiment I respectively, that is, two sub-pixel units 21e and 21f correspond to two diamond shaped color filter sub-pixels 11e and 11f, respectively, four sub-pixel units 21a, 21b, 21c and 21d correspond to four isosceles triangle shaped color filter sub-pixels 12a, 12b, 12c and 12d, respectively.

In this embodiment, the sub-pixel units 21a, 21b, 21c and 21d corresponding to the isosceles triangle shaped color filter sub-pixels 12a, 12b, 12c and 12d may have a same isosceles triangle shape as those of the sub-pixels 12a, 12b, 12c and 12d, and the sub-pixel units 21e and 21f corresponding to the diamond shaped color filter sub-pixels 11e and 11f may have a same diamond shape as those of the sub-pixels 11e and 11f. It is understood that in other embodiments of the present invention, depending on shapes of pixel units on the color filter substrate, the sub-pixel units 21 of the array substrate may be of any other geometric shapes, such as rectangle and circle.

In operation, each pixel unit on the array substrate is driven by two gate lines and three data lines. As shown in FIG. 4, the two gate lines comprise a first gate line 22 on top of the pixel unit 2 and a second gate line 23 at the bottom of the pixel unit 2, and the three data lines comprises a first data line 24, a second data line 25 and a third data line 26 from left to right. Each data line is connected with sources of thin film transistors 212 of the two sub-pixel units 21, and each gate line is connected with gates of thin film transistors 212 of the three sub-pixel units 21.

As an option, the first gate line 22 is connected with gates of three thin film transistors of three sub-pixel unit 21a, 21e, 21b on the array substrates corresponding to the two isosceles triangle shaped sub-pixels 12a, 12c arranged horizontally on the color filter substrate and one diamond shaped sub-pixel 11e sandwiched therebetween; the second gate line 23 is connected with gates of three thin film transistors of three sub-pixel unit 21c, 21d, 21f on the array substrates corresponding to the other two isosceles triangle shaped sub-pixels 12c, 12d on the color filter substrate and another diamond shaped color filter sub-pixel 11f. The first data line 24 is connected with sources of the two thin film transistors of the two sub-pixel units 21a, 21c on the array substrate corresponding to the left two isosceles triangle shaped sub-pixels 12a, 12c on the color filter substrate; the second data line 25 is connected with sources of the two thin film transistors of the two sub-pixel units 21e, 21d corresponding to the left diamond shaped sub-pixel 11e and the low right isosceles triangle shaped sub-pixel 12d on the color filter substrate; the third data line 26 is connected with sources of the two thin film transistors 212 of the two sub-pixel units 21b, 21f on the array substrate corresponding to the upper right isosceles triangle shaped sub-pixels 12b and the right diamond shaped sub-pixel 11f on the color filter substrate.

Figure 5:
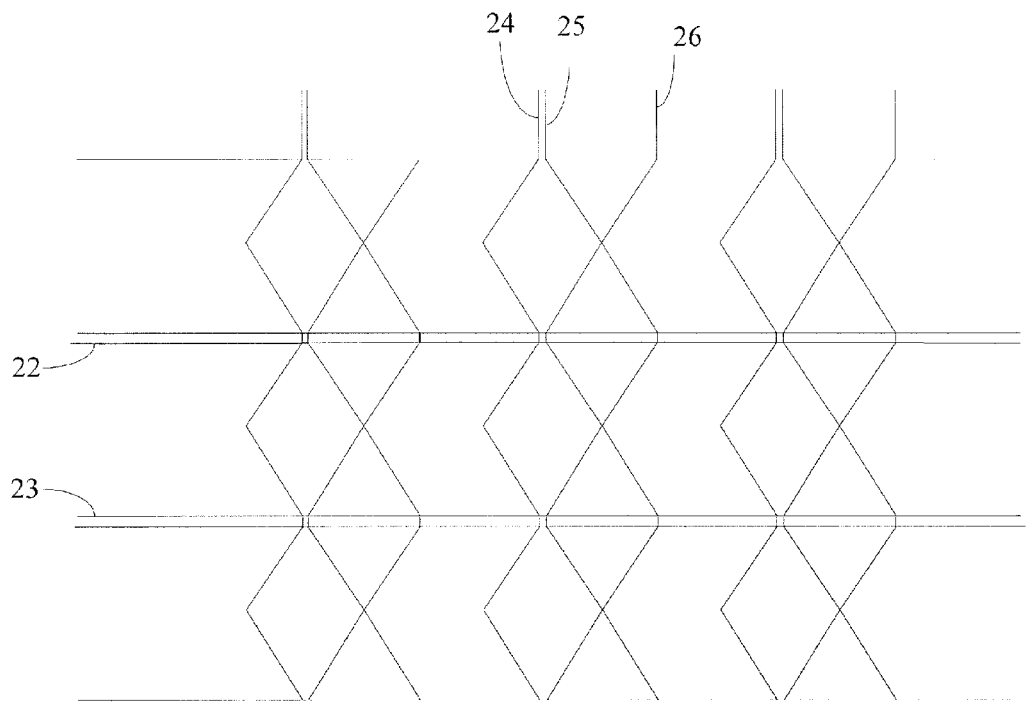
FIG. 5 schematically illustrates an arrangement of three data lines in the array substrate according to the second embodiment of the present invention.

Further, as shown in FIG. 5, the first data line 24, the second data line 25, the third data line 26 are routed along edges of said diamond shaped sub-pixels 11, which allows data lines to overlap with the black matrix footprint on the color filter substrate.

The array substrate provided in this embodiment realizes entire display of six sub-pixel units in one sub-pixel unit 1 in the color filter substrate according to embodiment I by two gate lines and three data lines. Fine display of contour of irregular pictures is realized. The color gamut of the color filter substrate is increased, and therefore the color display effect of the display is enhanced as a whole.

Embodiment III

The display panel according to the embodiment of the present invention comprises an array substrate and a color filter substrate disposed opposite to each other. The substrates described in the above embodiments may be used for said array substrate and the color filter substrate. For example, in this embodiment, the arrangement and color setting of sub-pixels of the pixel unit 1 of the color filter substrate are the same as that of sub-pixels of the pixel unit 1 in FIG. 2 of embodiment I. The arrangement of sub-pixel units of the pixel unit 2 of the array substrate is similar to that of FIG. 2, and layout of gate lines and data lines is the same as those in FIG. 5 of embodiment II. The image display process of the display panel will be described in detail below with reference to FIGS. 5-7.

Figure 6:
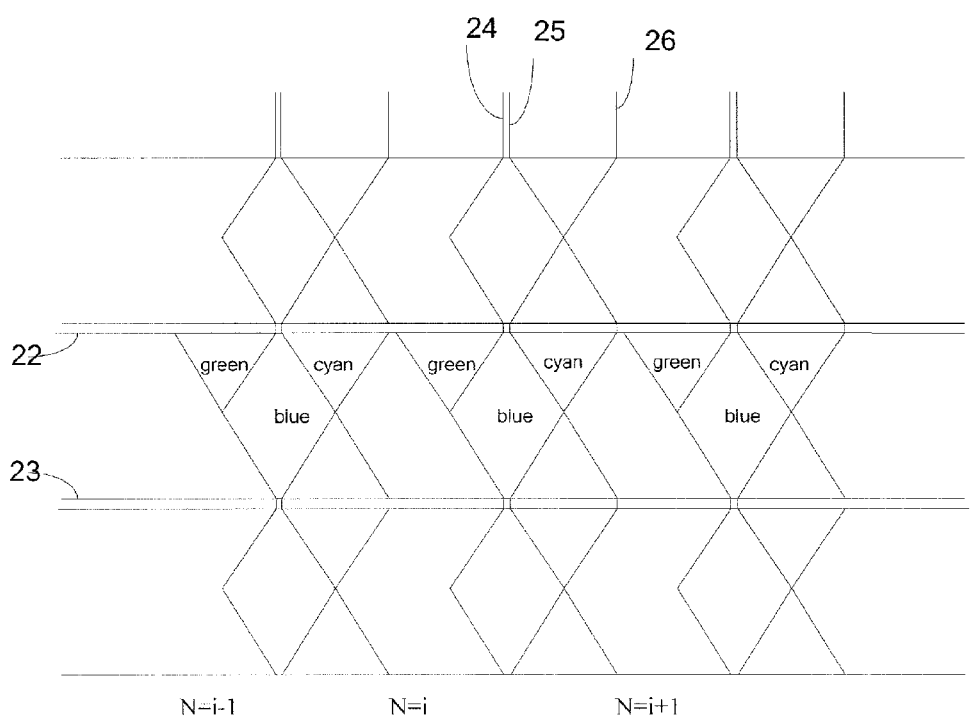
FIG. 6 schematically illustrates a display state of the array substrate according to the second embodiment of the present invention when a first gate line is conducted.
Figure 7:
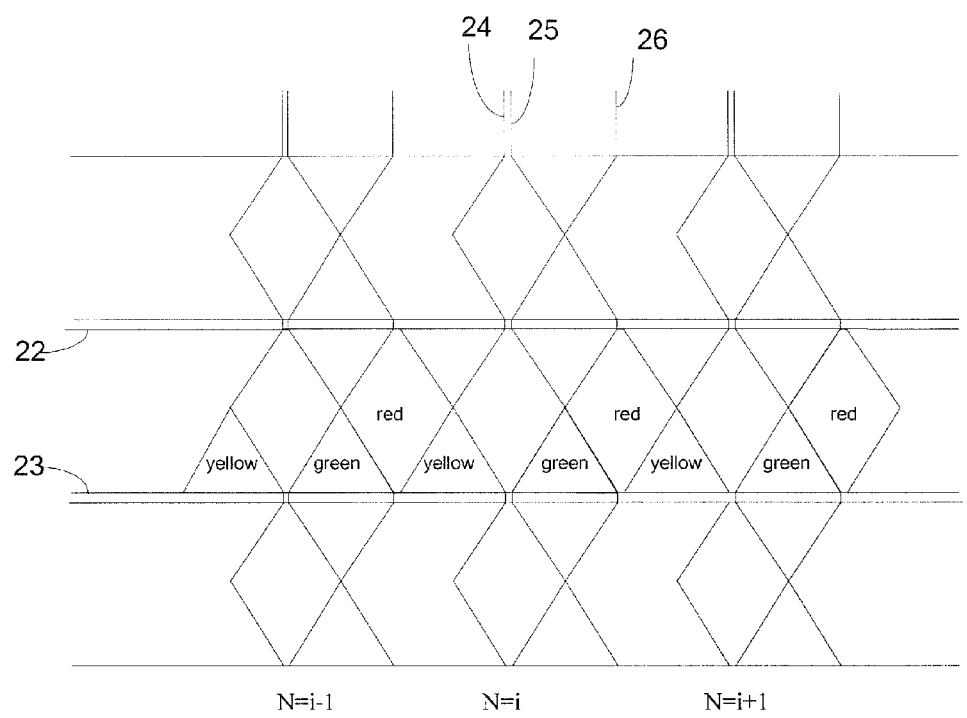
FIG. 7 schematically illustrates a display state of the array substrate according to the second embodiment of the present invention when a second gate line is conducted.

Taking the adjacent i−1$^{th}$ column of pixel unit 21, the i$^{th}$ column of pixel unit 21 and the i+1$^{th}$ column of pixel unit 21 in the i$^{th}$ row as an example, when the first gate line 22 on top of the pixel unit on the array substrate is conducted, as shown in FIG. 6, the first data line 24, the second data line 25 and the third data line 26 output signals for the green sub-pixel 12a, the blue sub-pixel 11e and the cyan sub-pixel 12b respectively to charge them. When the second gate line 23 at the bottom of the pixel unit is conducted, as shown in FIG. 7, the first data line 24, the second data line 25 and the third data line 26 output signals for the yellow sub-pixel 12c, the green sub-pixel 12d and the red sub-pixel 11f respectively to charge them. This realizes entire display of the i$^{th}$ row.

Embodiment IV

The liquid crystal display device according to the embodiment of the present invention comprises the display panel in above-mentioned embodiment. The liquid crystal display device may further comprise liquid crystal material filled between the color filter substrate and the array substrate. In some examples, the liquid crystal display device may further comprise a backlight source for providing backlight for the array substrate.

What are described above is related to the illustrative embodiments of the disclosure only and not limitative to the scope of the disclosure; the scopes of the disclosure are defined by the accompanying claims.

The invention claimed is:

1. A liquid crystal panel comprising a color filter substrate and an array substrate disposed oppositely thereto, wherein
the color filter substrate comprises a plurality of color filter pixel units, each of the color filter pixel units comprises six color filter sub-pixel units, the six color filter sub-pixel units being two diamond shaped color filter sub-pixel units and four isosceles triangle shaped color filter sub-pixel units and each of the six color filter sub-pixel units having a single color; every two isosceles triangle shaped color filter sub-pixel units are arranged into a sub-pixel column along a longitudinal direction with their vertex angles opposite to each other, and two sub-pixel columns are parallel to each other; the two diamond shaped color filter sub-pixel units and the two sub-pixel columns are disposed alternately in a horizontal direction; and colors of the diamond color filter sub-pixel units and the isosceles triangle shaped color filter sub-pixel units at least comprise red, blue and green,
the array substrate comprises a plurality of array pixel units, each of the array pixel units comprises six array sub-pixel units, each of the six array sub-pixel units having a single color, and the six array sub-pixel units being two diamond shaped array sub-pixel units and four isosceles triangle shaped array sub-pixel units and, which correspond to locations of the six color filter sub-pixel units of one color filter pixel unit in the color filter substrate and each of which comprises a thin film transistor and a pixel electrode,
each of the array pixel units is driven by a first gate line, a second gate line, and a first data line, a second data line, and a third data line, and each of the first, second, third data lines is electrically connected with two of the six array sub-pixel units, and each of the first and second gate lines is coupled with three of the six array sub-pixel units, wherein the first gate line is electrically connected with gates of thin film transistors of three of the six array sub-pixel units, the second gate line is electrically connected with gates of thin film transistors of other three of the six array sub-pixel units, the first data line is electrically connected with sources of two of the six array sub-pixel units, the second data line is electrically connected with sources of other two of the six array sub-pixel units, and the third data line is electrically connected with sources of remaining two of the six array sub-pixel units.

2. The liquid crystal panel of claim 1, wherein the two diamond shaped color filter sub-pixel units are congruent with each other, and the four isosceles triangle shaped color filter sub-pixel units are congruent with each other.

3. The liquid crystal panel of claim 1, wherein the diamond shaped color filter sub-pixel unit has one of its diagonals disposed in the longitudinal direction to make a length of the diagonal equal to a height of the sub-pixel column.

4. The liquid crystal panel of claim 1, wherein the plurality of color filter pixel units are disposed in an array, wherein tops or bottoms of color filter pixel units in a same row are kept in a same plane.

5. The liquid crystal panel of claim 1, wherein the colors of the six color filter sub-pixel units are partially same.

6. The liquid crystal panel of claim 1, wherein colors of the two diamond shaped color filter sub-pixel units are two of red, blue and green, a color of one of the four isosceles triangle shaped color filter sub-pixel units is the remaining one color.

7. The liquid crystal panel of claim 1, wherein colors of the two diamond shaped color filter sub-pixel units are red and blue respectively.

8. The liquid crystal panel of claim 1, wherein colors of two isosceles triangle shaped color filter sub-pixel units that are not in a same sub-pixel column and nonadjacent are green, colors of other two isosceles triangle shaped color filter sub-pixel units are two of yellow, cyan, pink and white respectively.

9. The liquid crystal panel of claim 1, wherein a color of one of the isosceles triangle shaped color filter sub-pixel units is green, colors of other three isosceles triangle shaped color filter sub-pixel units are three of yellow, cyan, pink, white, respectively.

10. The liquid crystal panel of claim 1, wherein the first gate line is disposed on top of the array pixel unit, the second gate line is disposed at bottom of the array pixel unit, and the first, second and third data lines are arranged in the longitudinal direction.

11. The liquid crystal panel of claim 10, wherein the first gate line is electrically connected with gates of the thin film transistors of the two isosceles triangle shaped array sub-pixel units and one diamond shaped array sub-pixel unit sandwiched therebetween, and the second gate line is electrically connected with gates of the thin film transistors of the other two isosceles triangle shaped array sub-pixel units and another one diamond shaped array sub-pixel unit.

12. The liquid crystal panel of claim 10, wherein the first data line is electrically connected with sources of thin film transistors of two isosceles triangle shaped array sub-pixel units on a left side thereof, the second data line is electrically connected with a source of a thin film transistor of a diamond shaped array sub-pixel unit on a left side thereof and a source of a thin film transistor of an isosceles triangle shaped array sub-pixel unit on a low right side thereof, the third data line is electrically connected with a source of a thin film transistor of an isosceles triangle shaped array sub-pixel unit on an upper left side thereof and a source of a thin film transistor of a diamond shaped array sub-pixel unit on a right side thereof.

13. The liquid crystal panel of claim 10, wherein the first, second and third data lines are disposed to extend in the longitudinal direction along edges of the diamond shaped array sub-pixel units.

14. A liquid crystal display device comprising a liquid crystal panel according to claim 1.

* * * * *